United States Patent [19]

Mielke

[11] Patent Number: 4,709,620
[45] Date of Patent: Dec. 1, 1987

[54] PISTON AND CONNECTING ROD ASSEMBLY

[75] Inventor: Siegfried Mielke, Neckarsulm, Fed. Rep. of Germany

[73] Assignee: Kolbenschmidt AG, Neckarsulm, Fed. Rep. of Germany

[21] Appl. No.: 39,813

[22] Filed: Apr. 14, 1987

Related U.S. Application Data

[63] Continuation of Ser. No. 641,531, Aug. 16, 1984, abandoned.

[30] Foreign Application Priority Data

Aug. 31, 1983 [DE] Fed. Rep. of Germany ....... 3331300

[51] Int. Cl.$^4$ ................................................. F16J 1/16
[52] U.S. Cl. ....................................... 92/187; 92/216; 403/150
[58] Field of Search ...................... 403/150, 151, 152; 92/187, 216; 60/255

[56] References Cited

U.S. PATENT DOCUMENTS

| | | | |
|---|---|---|---|
| 1,618,600 | 2/1927 | Matthews | 403/152 X |
| 2,276,040 | 3/1942 | Hull | 52/729 |
| 2,848,077 | 8/1958 | Tofanelli | 52/729 X |
| 3,479,929 | 11/1969 | Fangman | 92/187 |
| 3,702,092 | 11/1972 | Zollner | 92/187 |
| 4,544,299 | 10/1985 | Danchert | 92/187 X |

Primary Examiner—A. Michael Chambers
Assistant Examiner—John C. Fox
Attorney, Agent, or Firm—Sprung Horn Kramer & Woods

[57] ABSTRACT

In a piston and connecting rod assembly for reciprocating piston machines the bending load applied to the piston pin bosses owing to the deformation of the piston pin to an oval shape should be prevented and the weight should be reduced. This is accomplished in that the piston pin is I-shaped in cross-section with wide flanges, the outer surfaces of which are shaped in accordance with an arc of a circle.

6 Claims, 1 Drawing Figure

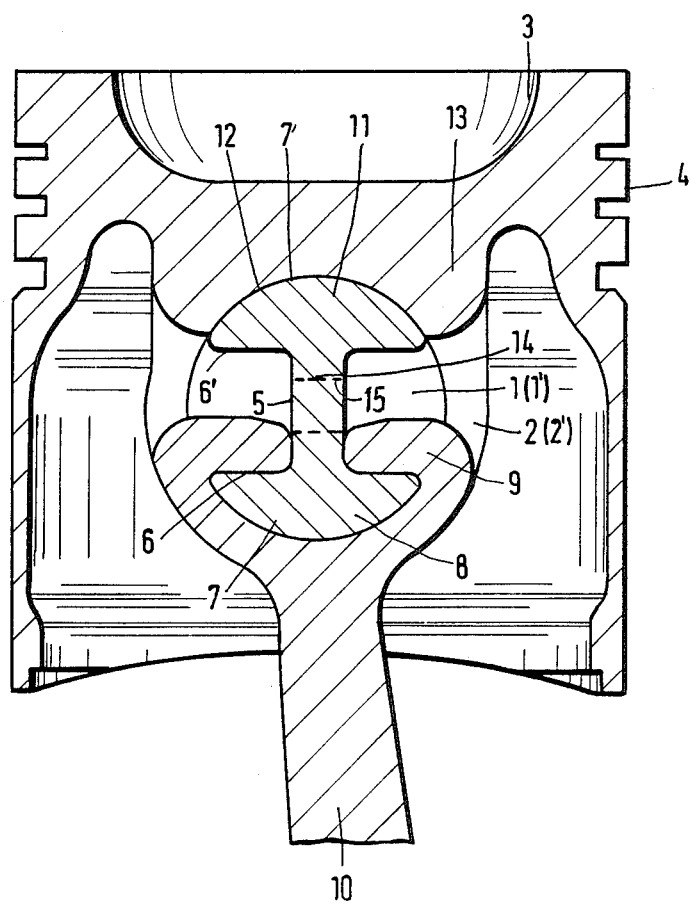

PISTON AND CONNECTING ROD ASSEMBLY

This application is a continuation of application Ser. No. 641,531, filed Aug. 16, 1984, now abandoned.

BACKGROUND OF THE INVENTION

This invention relates to a piston and connecting rod assembly for reciprocating piston machines.

In reciprocating piston machines the hollow-cylindrical piston pin constitutes a force-transmitting element and a pivot of a hinge by which the piston, and the connecting rod are connected. The forces exerted on the piston pin tend to deflect and shear the piston pin and to deform it to an oval shape. For a given cross-sectional area of the piston pin, an increase of its outside diameter will decrease its deflection and will increase its deformation to an oval shape. An excessively large deformation to an oval shape may be avoided by the use of a piston pin having a larger wall thickness. In practice, efforts are made to design the piston pin so that its deflection and its deformation to an oval shape take place appropriately to the same extend. Individual dimensions of such piston pins are specified in DIN 73121 and DIN 73122. Owing to the deformation of the piston pin to an oval shape, the highest stress is a tensile stress in the bore of the piston pin. The piston pin bosses are subjected to a compressive stress at their top apex throughout their cross-section. A considerable bending load, which is due to the oval shape of the piston pin, is superposed on said compressive stress. This results in an excessively high stress on the piston pin bosses and may result in a formation of cracks in the bosses.

For this reason, highly stressed piston pin bosses can be used only in conjunction with a piston pin which has a high resistance to deformation. But this fact is inconsistent with the general trend to reduce the masses of reciprocating piston machines. Higher stresses will be permissible if a tapered piston pin is used, which is formed with two annular conical constrictions, each of which extends from a point adjacent to the inner edges of a piston pin boss to a point adjacent to the inner edge of the adjacent small end bearing. But such tapered piston pins can be provided only in shapes having rotational symmetry. This is due to the nature of the grinding operations used to machine the piston pin and to its functional requirements because the piston pin is usually mounted to float so that it will rotate in operation. For this reason such a tapered piston pin cannot be used on conjunction with a tapered to stepped boss and whereas it can compensate the longitudinal deformation, it cannot compensate the deformation of the piston pin and its bore to an oval shape in cross-section (DE-B-No. 26 15 212).

SUMMARY OF THE INVENTION

It is an object of the present invention to provide, in a piston and connecting rod assembly for reciprocating piston machines, a piston pin which has a shape such that the piston pin bosses will not be subjected to a high bending load as a result of the deformation of the piston pin to an oval shape and that the weight of the piston and connecting rod assembly will be distinctly reduced.

This object is accomplished in accordance with the invention by the provision of a piston pin which is I-shaped in cross-section with wide flanges, the outside surfaces of which are curved in accordance with and along an arc of a circle.

Such a piston pin is relatively light in weight but has a relatively high section modulus and is resistant to a deformation to an oval shape. A comparison of the piston pin designed in accordance with the invention with a conventional piston pin reveals that the weight will be reduced by almost 20% for a given section modulus. Because in a piston pin the section modulus, which influences the deflection, is less critical than the bending load that is due to the deformation of the piston pin to an oval shape, a weight saving of as much as 50% can be achieved for a given material.

According to a preferred further feature of the invention, the inside surfaces of the flanges of the piston pin are transversely inclined to preferably have an inclination of 2 to 15%.

Because the piston pin may be regarded as a beam that is subjected to a uniform bending load, the piston may preferably be formed with relief bores in those portions which are subjected to relatively low shear stresses so that additional weight can be saved.

The piston pin designed in accordance with the invention must be installed in a predetermined orientation because, different from a hollow-cylindrical piston pin, the section modulus of its cross-section is not the same for all axes.

It has been found that it will be particularly desirable to clamp the piston pin in the connecting rod or in the bores of the piston pin bosses in an optimum position, in which the axis in which the cross-section of the piston pin has the highest section modulus and the vector of the maximum bending moment occurring in the piston pin are approximately parallel. In that case, the maximum section modulus will be effective during the operation of the engine. Whereas the lubrication will be inadequate when the conventional piston pins are clamped in position, such inadequate lubrication need not be feared where the piston pin designed in accordance with the invention is used, because the I-section piston pin will not obstruct the desposition of the lubricant mist in the bearings provided for the piston pin in the connecting rod or in the piston pin bosses. When the piston pin is clamped in a longitudinally fixed position in the piston pin bosses, there will be no need for bearing bushings and lateral locking means so that that measure will result in an additional saving of weight.

In a preferred embodiment of the piston and connecting rod assembly the piston pin is connected to the connecting rod at a forked small end portion thereof and said forked small end portion positively and frictionally embraces the outer and inner surfaces of the lower flange of the piston pin. That feature will further reduce the weight of the piston and connecting rod assembly.

If the small end portion of the connecting rod is inclined with respect to the remainder of the connecting rod, the piston pin can be adjusted to an optimum position as regards the stress on the piston pin.

A special advantage will be afforded if the arcuate outer surface of the upper flange of the piston pin protrudes into and is in snug contact with a mating recess formed in the inside surface of the piston head so that the piston head is directly supported by the piston pin. This results in a distinctly improved conduction of heat, particularly from the piston head, and in an improved transmission of force to the piston pin.

The piston pin may be made from case-hardened or nitrided steels of from ceramic materials or from fiberreinforced materials having a predominantely metallic matrix.

BRIEF DESCRIPTION OF THE DRAWINGS

The invention is illustrated by way of example in the drawing wherein the FIGURE is a cross-section of the invention and will be explained hereinafter.

DETAILED DESCRIPTION OF THE INVENTION

An I-section piston pin 5 made of case-hardened steel is mounted in the bores 1,1' of the hubs 2,2' of the aluminum piston 4, which is formed with a combustion recess 3. The inner surfaces 6, 6' of the flanges of piston pin have an transverse inclination of 2°. The outer surfaces 7,7' of the flanges are cylindrical sections and are curved in accordance with an arc of a circle. The inner surface 6 and the outer surface 7 of the lower flange 8 are positively and frictionally connected to the forked small end portion 9 of the connecting rod 10. That forked end portion extends at an angle of 20° to the remainder of the connecting rod 10. The arcuate outer surface 7' of the upper flange 11 protrudes into and is in snug contact with a mating recess 12 of the inside surface of the piston pin 13. The web 14 of the piston pin 5 has relief bores 15.

This piston and connecting rod assembly has been tested under a dynamic compressive load varying between $-2/-39$ kN and $-2/-40$ kN, which corresponds to gas pressure of 90 bars and 100 bars, respectively, in the cylinder. Said values are about 50% higher than the pressures usually occurring in the cylinders of Otto engines. The piston pin was not damaged by the predetermined ultimate number of $2 \times 10^6$ load cycles. The high strength of the piston pin designed in accordance with the invention, which strength has been ascertained in said tests, has been achieved with a piston pin which is lighter in weight by 47% than a corresponding hollow-cylindrical piston pin.

What is claimed is:

1. In a piston and connecting rod assembly for a reciprocating piston machine having a piston, a piston pin in the piston and a connecting rod connected to the piston pin, the improvement wherein the piston pin has a cross-section with the wide upper and lower flanges connected by a narrow web with parallel sides, said piston pin having an I-shaped cross-section, wherein the flanges comprise circular segments with outside surfaces along an arc of a circle and inside surfaces on both sides of the parallel sides of the narrow web, wherein the connecting rod has means clamping the piston pin in a fixed position in the connecting rod, said clamping means comprising a forked small end portion on the connecting rod which embraces the inside and outside surfaces of the lower flange of the piston pin.

2. The piston and connecting rod assembly according to claim 1, wherein the piston pin web has relief bores in a region thereof that is subjected to relatively low shear stress.

3. The piston and connecting rod assembly according to claim 1 wherein the piston has piston pin bosses and means clamping the piston pin in a fixed position in the piston pin bosses.

4. The piston and connecting rod assembly according to claim 3, wherein the piston pin is clamped in an optimum fixed position in which the axis in which the cross-section of the piston pin has the highest section modulus and the vector of the maximum bending moment occurring in the piston pin are approximately parallel.

5. The piston and connecting rod assembly according to claim 1, wherein the curved outside surface of the upper flange of the piston pin protrudes into and is in snug with a mating recess formed in the inside surface of the piston head.

6. The piston and connecting rod assembly according to claim 1, wherein the inside surfaces of the flanges of the piston pin have a transverse inclination of 2 to 15%.

* * * * *